(12) United States Patent
Leblang

(10) Patent No.: US 8,825,501 B1
(45) Date of Patent: Sep. 2, 2014

(54) COMPUTER CONTROLLED ARTICLE CLASSIFICATION AND PROCESSING SYSTEM

(75) Inventor: Jonathan Leblang, Menlo Park, CA (US)

(73) Assignee: Amazon Technologies, Inc., Reno, NV (US)

( * ) Notice: Subject to any disclaimer, the term of this patent is extended or adjusted under 35 U.S.C. 154(b) by 36 days.

(21) Appl. No.: 13/242,033

(22) Filed: Sep. 23, 2011

Related U.S. Application Data

(62) Division of application No. 10/748,745, filed on Dec. 30, 2003, now Pat. No. 8,055,508.

(51) Int. Cl.
 *G06Q 10/00* (2012.01)

(52) U.S. Cl.
 USPC ............................................. 705/1.1

(58) Field of Classification Search
 USPC ................... 705/14.4; 700/213–216
 See application file for complete search history.

(56) References Cited

U.S. PATENT DOCUMENTS

| | | | |
|---|---|---|---|
| 2,815,871 A * | 12/1957 | Kingsley | 414/285 |
| 4,195,347 A * | 3/1980 | MacMunn et al. | 700/215 |
| 5,128,861 A | 7/1992 | Kagami et al. | |
| 5,168,445 A | 12/1992 | Kawashima et al. | |
| 5,526,257 A * | 6/1996 | Lerner | 705/7.34 |
| 5,592,378 A * | 1/1997 | Cameron et al. | 705/26.62 |
| 5,774,868 A | 6/1998 | Cragun et al. | |
| 5,774,870 A | 6/1998 | Storey | |
| 5,794,210 A | 8/1998 | Goldhaber et al. | |
| 5,809,479 A | 9/1998 | Martin et al. | |
| 5,918,213 A * | 6/1999 | Bernard et al. | 705/26.35 |
| 5,963,919 A | 10/1999 | Brinkley et al. | |
| 5,988,346 A | 11/1999 | Tedesco et al. | |
| 6,049,778 A | 4/2000 | Walker et al. | |
| 6,055,519 A | 4/2000 | Kennedy et al. | |
| 6,119,099 A | 9/2000 | Walker et al. | |
| 6,196,458 B1 | 3/2001 | Walker | |
| 6,289,260 B1 * | 9/2001 | Bradley et al. | 700/216 |
| 6,368,042 B1 * | 4/2002 | Gagnon et al. | 414/392 |
| 2001/0029465 A1 * | 10/2001 | Strisower | 705/14 |
| 2002/0049621 A1 * | 4/2002 | Bruce | 705/7 |
| 2002/0070862 A1 * | 6/2002 | Francis et al. | 340/572.1 |
| 2002/0077929 A1 * | 6/2002 | Knorr et al. | 705/26 |
| 2002/0077960 A1 | 6/2002 | Kiely et al. | |
| 2002/0103569 A1 * | 8/2002 | Mazur | 700/216 |

(Continued)

OTHER PUBLICATIONS

Warehouse Science J. J. Bartholdi, III et al "Design of a fast-pick area" Jan. 31, 2002 URL: http://web.archive.org/web/20020131000517/http://www.isye.gatech.edu/people/faculty/John_Bartholdi/wh/book/forward/projects/projects.html.*

(Continued)

*Primary Examiner* — Tonya Joseph
(74) *Attorney, Agent, or Firm* — Knobbe, Martens, Olson & Bear LLP

(57) ABSTRACT

A system for processing and classifying articles that classifies a set of articles based at least upon the locations of the articles within a structure. The system provides a notification over a computer network to a user, wherein the notification informs the user that the user has a time period within which to select a first article from the set of classified articles to add to a pre-existing order by the user, wherein the time period is based at least in part on the anticipated time to transfer at least one article in the set of articles to a different location within the structure.

29 Claims, 11 Drawing Sheets

(56) References Cited

U.S. PATENT DOCUMENTS

| | | | |
|---|---|---|---|
| 2002/0133424 A1* | 9/2002 | Joao | 705/26 |
| 2002/0156699 A1 | 10/2002 | Gray et al. | |
| 2002/0169698 A1* | 11/2002 | Chien | 705/28 |
| 2003/0050834 A1* | 3/2003 | Caplan | 705/14 |
| 2003/0093335 A1* | 5/2003 | Silverbrook et al. | 705/26 |
| 2003/0097311 A1 | 5/2003 | Shinohara et al. | |
| 2003/0130903 A1 | 7/2003 | Silverbrook et al. | |
| 2004/0153207 A1* | 8/2004 | Peck | 700/214 |
| 2004/0153379 A1* | 8/2004 | Joyce et al. | 705/28 |
| 2004/0249497 A1* | 12/2004 | Saigh et al. | 700/216 |
| 2004/0260710 A1 | 12/2004 | Marston et al. | |
| 2005/0010857 A1 | 1/2005 | Shmukler et al. | |
| 2007/0143205 A1* | 6/2007 | Starmanns et al. | 705/37 |
| 2008/0077471 A1* | 3/2008 | Musgrove et al. | 705/10 |

OTHER PUBLICATIONS

Colacecchi, Mary Beth, "Conquering last-minute mania; inventory, service and staff planning are key; mail order business": Mar. 1994.

Tedeschi, B., "Fulfilling Orders is a Challenge for Many Internet Companies" The New York Times on the Web, dated Sep. 27, 1999 (5 pages).

Waddington, Alan: "Mail Order Inventory Control": 1983.

* cited by examiner

| ARTICLE IDENTIFIER | DIMENSIONS | LOCATION | ESTIMATED TRANSFER TIME TO PACKING AREA | LEVEL | ESTIMATED TIME TO RETRIEVE | TOTAL ESTIMATED TIME TO ACCESS AND TRANSFER TO PACKING AREA |
|---|---|---|---|---|---|---|
| 125691 | 13"x3"x6" | ROW 3, COL. 1 | 1545 SECONDS | 1 (BOTTOM) | 160 SECONDS | 3145 SECONDS |
| 347812 | 6"x6"x0.25" | ROW 6, COL. 3 | 1820 SECONDS | 3 (TOP) | 60 SECONDS | 2420 SECONDS |

FIG. 5

Thank you for your order placed on June 30, 2003. You can add one or more of the items below to your existing order without delaying shipment of your order. This offer expires in 30 minutes, at 6:45 PM PST, July 2, 2003.

| Item | Price | Special Offer | |
|---|---|---|---|
| Sony headphones | $15.99 | 10% Off and free Shipping if added to order | Add to Order |
| 512 Mbyte Compact Flash card | $122 | | Add to Order |
| 6 AA Batteries | $4.99 | Free shipping if added to order | Add to Order |

FIG. 7

COMPUTER CONTROLLED ARTICLE CLASSIFICATION AND PROCESSING SYSTEM

PRIORITY CLAIM

This is a divisional of U.S. patent application Ser. No. 10/748,745 (filed 30 Dec. 2003). The entire disclosure the priority application is hereby incorporated by reference herein in its entirety.

BACKGROUND OF THE INVENTION

1. Field of the Invention

The present invention relates to article classification, and in particular, to methods and systems for classifying articles based on selected article characteristics and for processing the articles based on selected article characteristics.

2. Description of the Related Art

At least in part due to the failure of appropriately classifying articles or items in a warehouse or fulfillment center, many conventional warehouse and order fulfillment centers are inefficient in terms of article processing. For example, articles are often not sufficiently classified to determine what articles can be efficiently packed and shipped together. As a result, rather than pack and ship products that may be desired by users in relatively fewer packages and shipments, many current order fulfillment systems inefficiently split orders into several shipments. Alternatively, for those orders intended to be delivered in several shipments, oftentimes order fulfillment systems fail to optimize the grouping of products in each shipment.

Even if orders are efficiently packed for shipping, most order fulfillment systems fail to allow a user to efficiently add items to a shipment at a time subsequent to when the order is placed. Users are often not aware of the deadline for adding articles to an order until after the deadline has passed, or, if the users are aware of the deadline, the users are often not apprised of the risk that adding to the order may adversely affect shipping time and cost. It therefore would be desirable to notify users when articles could be added to an order and shipped in a manner that would not impact the shipping time or cost.

SUMMARY OF THE INVENTION

The present invention relates to methods and systems for classifying articles based on selected article characteristics. An order processing system notifies a user who ordered a product when the ordered product is about to ship and allows the user to add items that the system has classified as being eligible based on selected article characteristics. By appropriately classifying articles by article characteristics, embodiments of the present invention ensure the efficient ordering, packing, transportation and/or delivery of subsequently-ordered items. Embodiments of the present invention facilitate the shipment of multiple products together, thereby reducing overall consumption of packing materials and the amount of energy consumed in transporting products.

One embodiment is a method of processing orders and shipments. A system receives over a network a user order for a first article during a first order session. The first article order is assigned to a fulfillment center. Additional articles are identified as being eligible to be added to the first order if ordered by the user before a first occurrence, wherein the identification of the additional articles is based at least in part on an estimated time to transfer the additional articles to a first location. After the first order session has been completed, the user is notified that if the user orders one or more of the eligible articles before a first time, the ordered eligible article will be delivered with the first article and without delaying delivery of the first article, wherein the first time is related to the first occurrence. An order for at least one of the eligible articles is received from the user. A determination is made as to whether the order for the at least one eligible article is received before the first occurrence. By way of example the first occurrence can be one of a packing process, and a charge process. By way of further example, the first time can be less than five minutes after notifying the user. The first time optionally includes at least the time to transfer at least a first of the eligible articles from a storage area to the first location. By way of further example, the first time can be less than four hours after notifying the user. The user can optionally be notified that an order for at least one eligible article was not accepted in response to determining that the order for the at least one eligible article was received after the first time. Optionally, the user is offered an incentive to order one or more eligible articles, the incentive including one or more of a discount on at least one article, a discount on shipping costs, and a free article. Optionally, the notification, or at least a portion thereof, is provided to the user at least partly in response to determining that a terminal associated with the user is online. Further, the notification, or at least a portion thereof, is provided to the user via a toolbar displayed on a user terminal.

BRIEF DESCRIPTION OF THE DRAWINGS

FIG. 5 illustrates an example database structure and entries.

FIG. 7 illustrates an example interface that that enables a user to add an item to an existing order.

DETAILED DESCRIPTION OF PREFERRED EMBODIMENTS

Figure 1A:
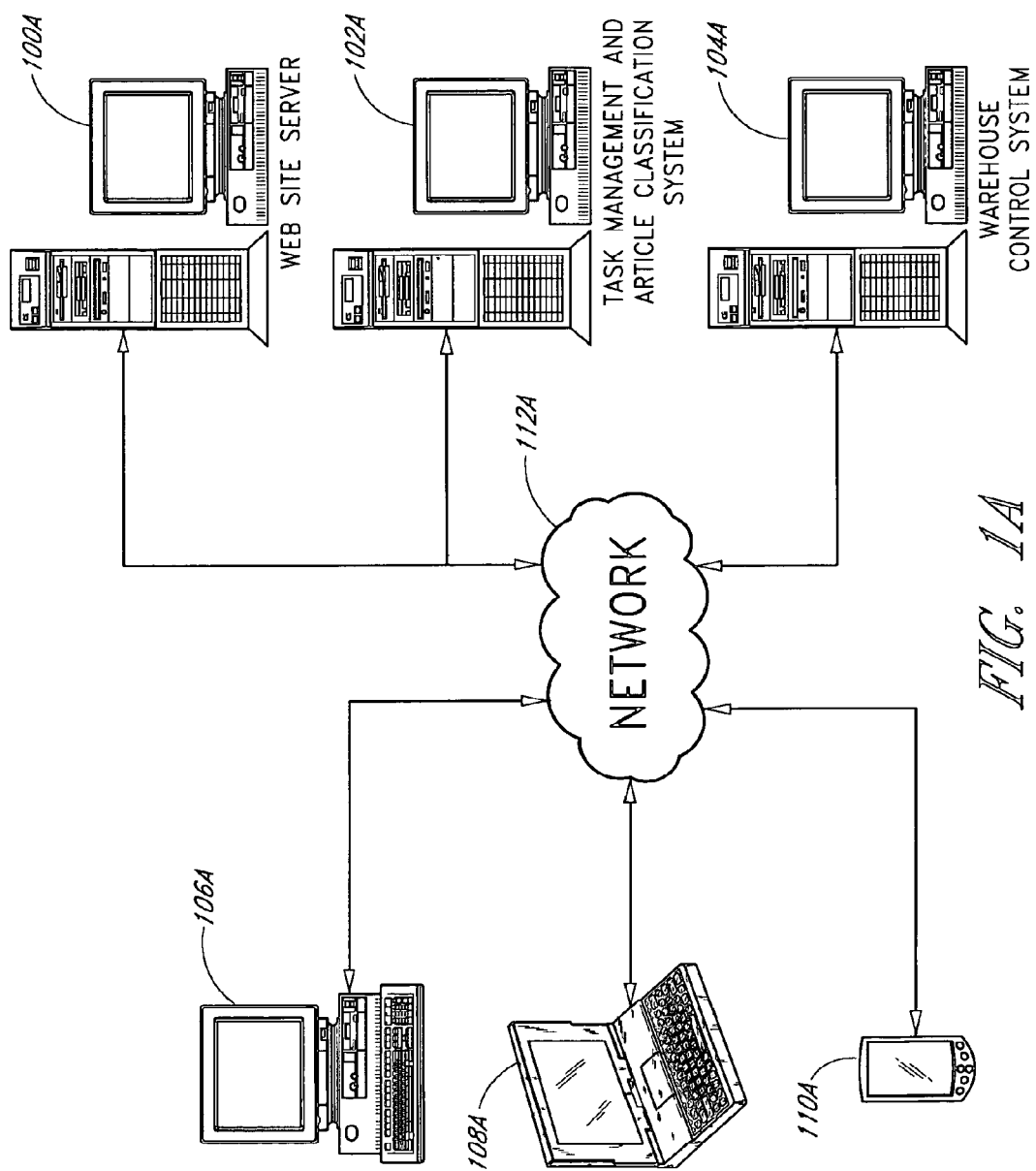
FIGS. 1A-1C illustrate an example networked article categorization and fulfillment center.

Throughout the following description, the term "Web site" is used to refer to a user-accessible server site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well. For example, HDML (Handheld Device Markup Language), WAP (Wireless Application Protocol), WML (wireless markup language), or the like can be used with cell phones, personal digital assistants (PDAs), and the like.

In addition, unless otherwise indicated, the functions described herein are preferably performed by programs including executable code or instructions running on one or more general-purpose computers that can form part of corresponding computer systems or subsystems. The computers can include one or more central processing units for executing program code, volatile memory, such as RAM for temporarily storing data and data structures during program execution, non-volatile memory, such as a hard disc drive or optical drive, for storing programs and data, including databases, and a network interface for accessing an intranet and/or the Internet. However, the present invention can also be implemented using special purpose computers, state machines, and/or hardwired electronic circuits. The example processes described herein do not necessarily have to be performed in the described sequence, and not all states have to be reached or performed.

Further, while the following description may refer to "clicking on" a link or button, or pressing a key in order to provide a command or make a selection, the commands or selections can also be made using other input techniques, such as using voice input, pen input, mousing or hovering over an input area, and/or the like. In addition, the terms article, item and product may be used interchangeably.

The present invention relates to article classification, and in particular, to methods and systems for classifying articles based on selected article characteristics. For example, the article characteristics can include the physical location of an article in a fulfillment center, and/or the distance of an article from a predetermined location. As will be described in greater detail below, in some embodiments a networked inventory control and order processing system enables the efficient delivery of articles based in part on article characteristics. Advantageously, an example order processing system notifies a user who has a pending product or article order when the ordered product is about to ship and allows the user to add items to the order for a limited time. Thus, embodiments of the present invention further facilitate the shipment of multiple products or articles together, thereby reducing overall consumption of packing materials and the amount of energy consumed in transporting products.

As described in greater detail below, in one embodiment, ordered articles shipped from a fulfillment center go through various states during the fulfillment process. An example fulfillment process is performed as follows. An order for an article is received from a user by an order processing system. The user is presented with a record of the total amount of the order, including any shipping costs. The order may be provided via a client computer communicating with a Web site during an Internet session. During the session, a connection is maintained while the client and server are communicating back and forth or for a given duration. The session can end when either or both the client and server terminate it.

The order processing system then assigns the order to an appropriate fulfillment center. The article is physically retrieved from its storage location. The article is then sorted as needed, boxed, and shipped. The sort process can be used when there are multiple items that are to be packed together. The multiple items can be retrieved at different times by different personnel, and are sorted into specific corresponding bins or locations from which they will be retrieved and subsequently packed together for shipment. The user is typically charged or billed when the products are shipped. In one embodiment, the user can add an item, from a selected set of items, to the order up until the time that it is boxed, charged or billed.

In particular, at time N before the order is charged, billed, packed/boxed and/or shipped, a notification event takes place, wherein the user is notified that the time in which the user can change or add to the order will expire in time M (where M<=N). The user will then have time M to add selected articles to the order. The selected items can be presented to the user in a variety of forms, for example, the notification can include a list or a link to a list of products or articles that the user can add to the order without affecting the shipping time and/or cost. In one embodiment, time M is set to expire before the user is charged for the original order. Thus, for a given order that is about to be shipped, only one charge process needs to take place for both the original article (s) in the order and any added article.

In one embodiment, time N is any time between the time the order was placed and the time that the order is, or is predicted to be, charged, billed, or about to be packed or boxed for shipping. However, time N can be referenced to other events as well. For example, N can optionally be the period between when an article in a pending order is removed from its storage area in a warehouse and when the article is delivered to a packing area. Preferably, time N is selected to be close enough to the time of shipment to instill in the customer a sense of imminent order shipment. For example, time N can be set to 45 minutes, 2 hours, 8 hours, or 1 day before the predicted shipping or packing date and time of the previously ordered article.

As discussed above, time M is less than or equal to N. In practice M is set so that the user has a sense of urgency and limited time to modify or add to the user's order. For example, time M can be set to 10 minutes, 1 hours, 4 hours, or 12 hours before the expiration of time N. The time M can also be longer than one day.

The notification is generated by the order processing system and transmitted to the user via one or more communication channels. The notification can be pushed to the user, that is, the user does not need to take proactive action to retrieve the notification. In addition, or instead, the notification can be pulled by the user, wherein the user actively checks or requests the status of the user's order, or visits a location, such as a website page, where the notification is displayed.

By way of example, and not limitation, the notification channels can include a message presented on a merchant, vendor, or affiliate's website. The user can be identified at the website by the user logging in, or via information stored in a file or cookie located on the user's terminal or computer system. In addition or alternatively, the notification can be provided via a client application residing or executing on the user's terminal, which can be, by way of example, a personal computer, PDA, Blackberry-type device, cell phone, or other device that allows for message reception.

By way of example, the notification message can be delivered via a browser plug-in, such as a toolbar or sidebar or Java or other script application, or to a browser otherwise equipped to receive such message notification. In addition or alternatively, the notification message can be delivered via an instant messaging client (such as AIM (America On Line Instant Messenger) or MSN (Microsoft Network) messenger or IRC (Internet Relay-Chat). Further, the message notification can be delivered via e-mail, or via SMS or other cell phone based messaging system. Still further, the message notification can be delivered via a paging mechanism to devices equipped to receive text or numeric pages, and/or via e-mail to any device or devices equipped to receive e-mail. In addition, or alternatively, the message notification can be delivered via a live or automated voice to a phone or other device equipped to receive voice messages.

Once the user receives the notification the user can elect to respond by adding one or more articles to the user order within the time M. The user can make a selection from a list or grouping of articles provided by the order processing system. As will be described below, the list or grouping of articles can be generated based at least in part on whether the added article will keep the original shipment time of the original article, whether the physical proximity of the added article is sufficiently close to the location of the originally ordered article, and/or other criteria. The response and selection can be made using one or more communication medium including, for example, those used to provide the notification message. Thus, for example, the response can be made via the web, such as via the merchant, vendor, or affiliate's website, via a special purpose application, via a web browser plug-in, via a toolbar, via an instant message, via SMS, via voice or a key press on a cell phone or similar device, via e-mail, and/or the like.

As described above, the list or group of articles presented to the user are selected by the processing system. The list or group of articles are chosen by the processing system or operator so that they have the characteristic that adding one or more of the articles to the order will not change the shipping time and/or shipping charge to the user. At the operator's discretion, even if the actual shipping costs increase as a result of added articles, the operator can decide to bear the additional costs so that the shipping cost to the user remains unchanged. This may be done in order to promote additional sales, to specifically promote sales of high margin items, or to promote a new store, by way of example. In addition the list or group of articles may be chosen by the processing system or operator using various business logic. Thus, for example, the list or group of articles can be generated based on cross-sell criteria, the net or gross profit margins, whether a given article is a clearance or on sale article. The list or group of articles can also be limited by the communication medium and/or user terminal used to transmit or receive the notification message or user response. For example, the list may be relatively large or extremely large if the notification or response is being communicated via a website. The list may be relatively small or very small if the notification or response is being communicated via SMS to a cell phone or other SMS terminal having a generally small display.

The user can optionally be offered incentives to add an article to the order during or before time M. The incentives can include special offers, discounts (e.g., a percent or dollar off), reduced or free shipping, free additional articles, credits towards future purchases, and/or other types of incentives or offers.

In the discussion that follows, embodiments of the order processing system are described in conjunction with a variety of illustrative examples.

FIG. 1A depicts an example of hardware and software components that are invoked or used in one embodiment during the above-described processes, including a web site server 100A, a task management/article classification system 102A, a warehouse control system 104A, and user terminals 106A, 108A, 110A. The system elements are connected together for communication purposes via a network 112A.

The foregoing components can be used to place, process, and fulfill orders. In this example, the user terminals are a desktop computer 106A, a laptop computer 108A, and a personal digital assistant 110A. As depicted by this drawing, users access the web site served via server 100A using respective terminals 106A-110A, or other networked terminals. The user terminals 106A-110A may run commercially-available Web browser applications such as Microsoft Internet Explorer®, which implement the basic World Wide Web standards such as HTTP and HTML. However, other interfaces can be used as well. The terminals 106A-110A may also run a commercially available e-mail application, such as Microsoft Outlook® or Outlook Express®, which may be used to communicate information with the site server 100A. The e-mail applications and the browsers may be integrated with one another, and/or may be integrated with other application programs or the operating system.

A warehouse control system 104A, located in or accessible from a warehouse, is used to track the warehouse inventory and location of articles. The articles can include items such as books, DVDs, electronics, cooking equipment, clothing, and/or the like. The web site server 100A, task management and article classification system 102A, warehouse control system 104A, and user terminals 106A-110A are networked together via network 112A, which include one or more networks, such as the Internet and/or an intranet. In another embodiment, the functionality of the server 100A, task management and article classification system 102A, and the warehouse control system 104A are optionally combined into a single system.

In the example embodiment described herein, the web site server 100A includes a computer system and associated content that are accessible via the network 112A. The web site server 100A may serve one or more websites that include content spanning multiple Internet domains, and/or may be implemented using physical servers that are geographically remote from one another. The server 100A can include an HTML database used to generate Web pages in response to the actions of end users. In other embodiments, the served web site may be in the form of an intranet site, in which case the terminals 106A-110A may be coupled to the site by a private network. In one embodiment, one or more of the terminals 106A-110A are coupled to the web site server 100A via a VPN (virtual private network). By way of example the web site may be in the form of an online store generally accessible by those with access to the Internet.

Figure 1B:
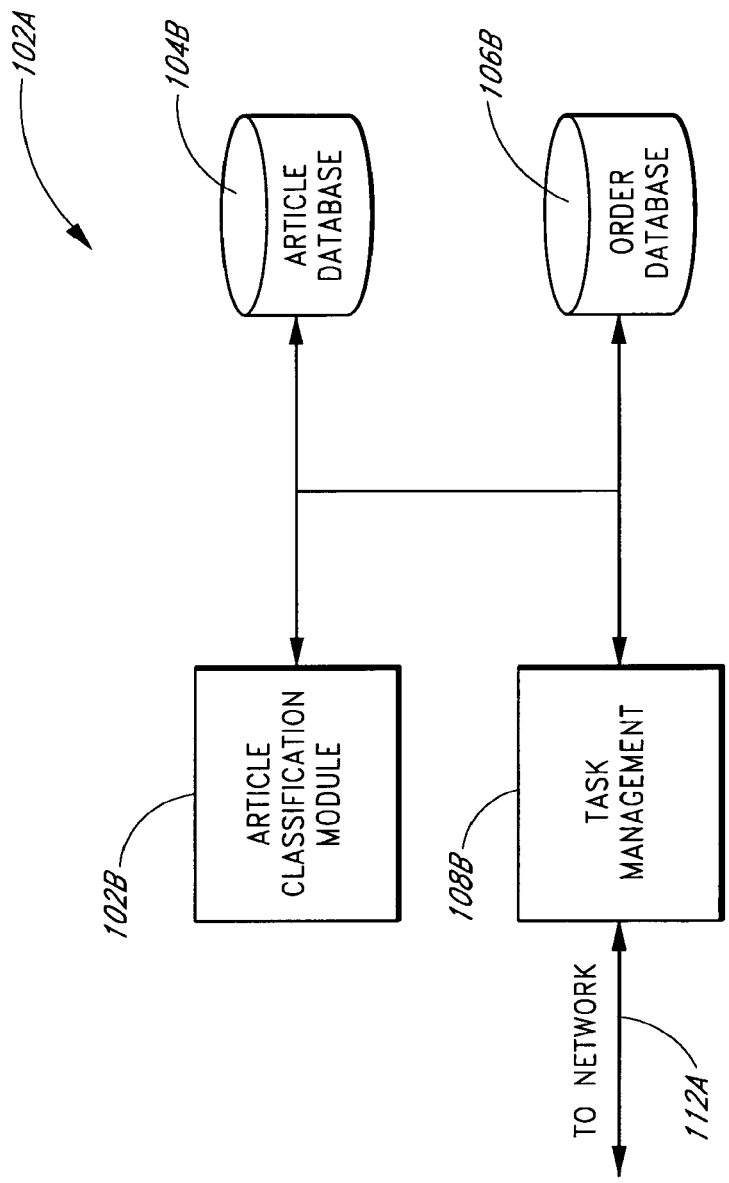

As depicted in FIG. 1B, the task management and article classification system 102A includes a task management server 108B. The server 108B is used to control the overall order and order fulfillment process flow and handles interactions with users and order fulfillment centers, including warehouses. The server 108B is also coupled to an order database 106B which keeps track of user orders, the identity of the warehouse or order fulfillment center that will be used to ship the articles in the orders, and the expected shipping date of each order. The server 108B is further coupled to an article database 104B that stores product or article related information, including for example, the cost of the article, the size and weight of the article (for shipping and handling purposes), the number of the article in inventory, and the location and accessibility of the article inventory. The database 104B can further include information related to purchase incentives that can be offered to users if they add corresponding articles to an existing order. Various other back-end components (not shown) are also used for this purpose.

The task management and article classification system 102A also includes an article classification module 102B which includes the basic functionality for suggesting articles to the user that the user may want to add to an existing order prior to the packing and shipment of the existing order. The article classification module 102B accesses the article database 104B that includes information indicating how accessible articles are in a warehouse, how easily and/or quickly an article can be retrieved for shipping, and which articles are related or are typically used or operated together (such as an electronic article and batteries for the same, or a camera and a camera case for the same). The article database 104B may further include such information as article profit margins, articles that the seller wants to dispose of quickly, the operability of a given article with other articles, the quantity of articles in inventory, the article shelf life, and the like. The article classification module 102B provides suggestions or options to the user as to what additional articles can be added to an existing order without adversely affecting the shipment date and/or without increasing the shipping cost of the order.

The article classification module 102B can further incorporate or utilize collaborative filtering in recommending items to be added to the order. For example, collaborative filtering identifies a set of user's whose purchased items and/or rated items that overlap one or more other users' purchased and rated items. The collaborative filter aggregates information related to these items from these similar users, and eliminates all or selected items that the user has already purchased and/or rated. The remaining items may be included in the set of items recommended or suggested to the user by the article classification module 102B if the items can be added to the existing order without adversely affecting the shipment date and/or without increasing the shipping cost of the order. In addition, the article classification module 102B can further refine the set of recommended or suggested items based on other criteria, such as whether the item is overstocked, has a limited shelf life, and/or on the user profile. The user profile can include user preferences, purchase history information, the items on the user's wish list, the user's browsing history, and/or category preferences. Thus, the suggested set of items can be personalized for a given user.

Figure 1C:
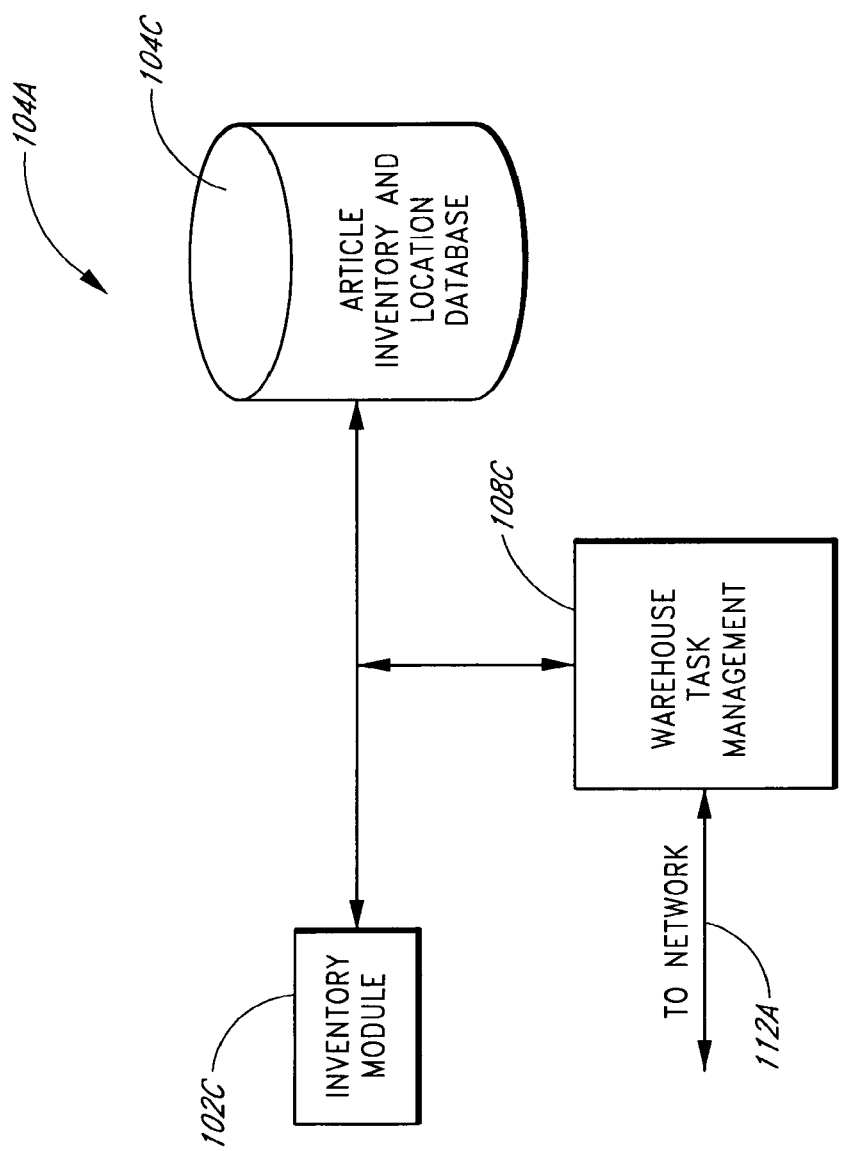

FIG. 1C illustrates the warehouse control system 104A in greater detail. The example warehouse control system 104A includes a warehouse task management server 108C coupled to an inventory control module 102C, and to an article inventory and location database 104C. The warehouse task management server 108B interacts with the web site server 100A and the task management and article classification system 102A, and controls the processing of incoming inventory and outgoing inventory to the fulfillment center. The inventory module 102C keeps track of the quantity, location and accessibility of articles in the fulfillment center, and stores such information in the database 104C. The information stored in the database 104C optionally can be the same as, a subset of, or partially overlap with the information stored in article database 104B illustrated in FIG. 1B.

The layout of a fulfillment center typically includes a storage area or areas, a packing area, and a loading area. The storage area can include shelving systems or other storage units and may be partitioned into a long-term (and less accessible) storage area and a short-term (and more easily accessible) storage area. The packing area is used to load one or more articles into a box or other packing container, and the loading area is used to transfer packed or boxed articles to trucks, trains, or the like for shipment to the user. The article or articles stored in the short-term storage area may include those articles that are predicted based on past experience, surveys, or otherwise, to be more likely to be included in a typical user's order. These articles may be placed near to the packing and loading areas in order to facilitate their rapid identification and addition to an order. The articles in short-term storage may also be placed in relatively more accessible locations that do not require a forklift or other specialized equipment to access.

An example of a type of article that would be located in the short term storage area is batteries. Batteries are often added to orders for electronic devices, and may be a common type of article that a user would be interested in adding to an existing order if they had failed to remember to do so when placing the order. Another example of a type of article that would be located in the short term storage area is a best-selling novel that is frequently purchased by customers. Because articles in short-term storage are closer to the packing and loading areas, and are otherwise relatively more accessible, they can quickly be added to an order shipment. Thus, the time M that the user can be allowed to add articles in short-term storage to an order about to ship can be relatively long as compared to the time that a user can be allowed to add articles that are located further away or are less accessible.

Figure 2:
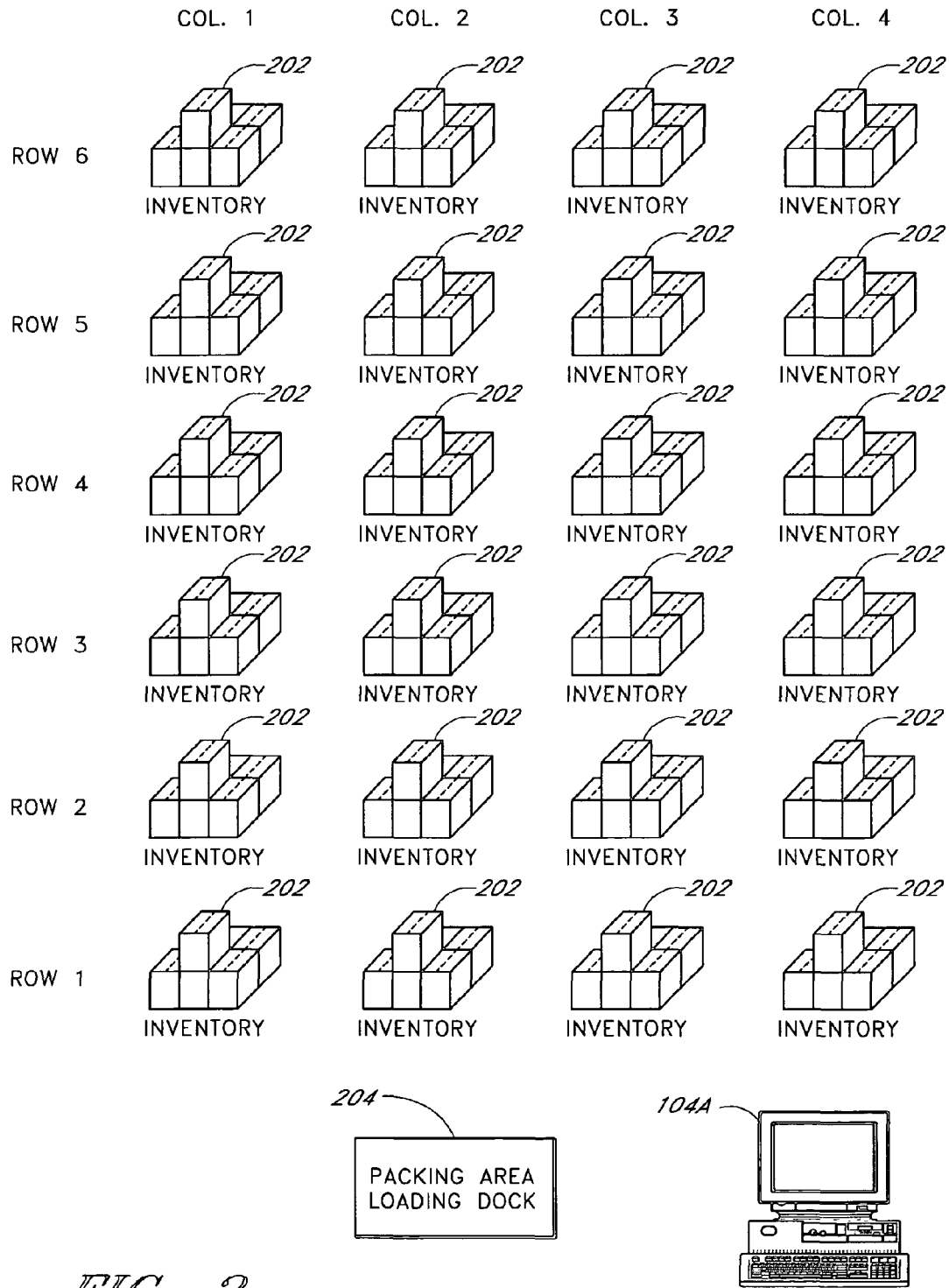
FIG. 2 illustrates an example warehouse.

FIG. 2 illustrates the layout of a portion of an example warehouse or fulfillment center, including inventory 202 and the warehouse control system 104A discussed above. In this example, the inventory 202 is stored in rows and columns, separated by walkways via which people or moving equipment, such as forklifts or conveyors, can move to place or retrieve articles from the inventory 202. In other embodiments, the layout can include just rows or just columns, and/or the layout can be distributed spoke-like relative to a center or off-center point. The warehouse or fulfillment center further includes a packing area and loading dock 204. In other embodiments, the packing area can be a separate area at a distance from the loading dock. In addition, the warehouse can include one or more buildings or other structures.

As illustrated, some of the inventory 202, such as inventory in row 1, column 1, is significantly closer to the packing area and loading dock 204 as compared to other inventory, such as inventory located in row 6, column 1. In addition, some inventory sits on top of or in front of other inventory. Thus, to access certain inventory, the use of inventory moving equipment, such as a forklift, may be needed. The time it takes to access and deliver an article out of inventory 202 to the packing area and loading dock 204 can be based, at least in part, on the distance from the packing area and loading dock 204 and on whether other inventory 202 has to be moved in order to access the article.

Figure 3:
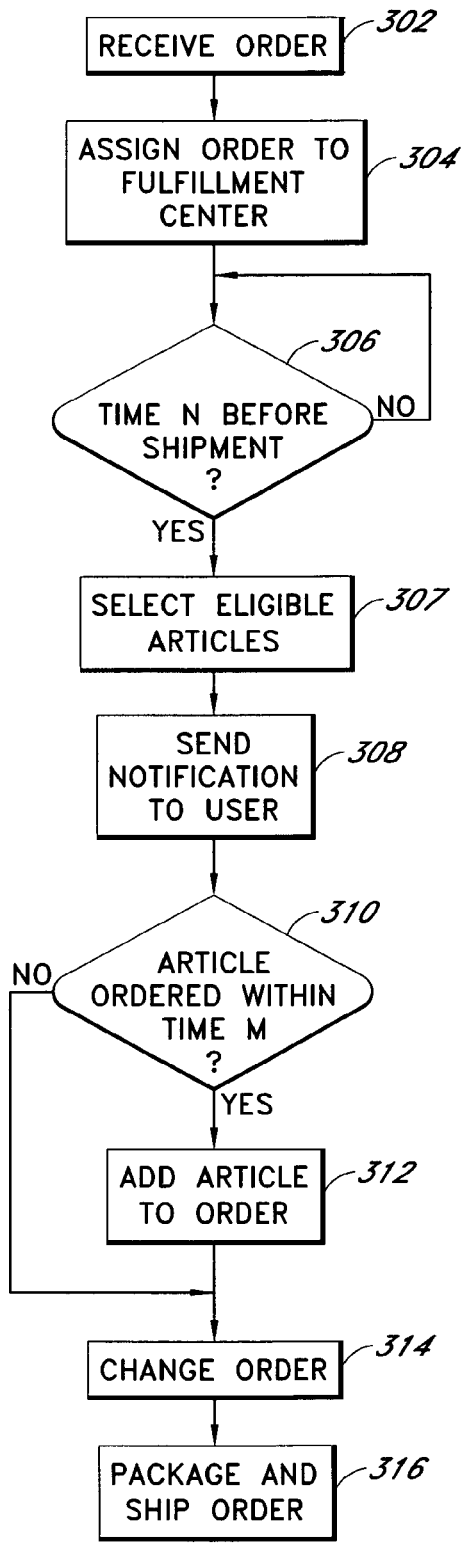
FIG. 3 illustrates an example order process.

FIG. 3 illustrates an exemplary sequence of acts that are performed by the web site server 100A, the task management and article classification system 102A, and the warehouse control system 104A. At state 302 an order for an article is received by the web site server 100A from a user or customer during a first networked order session on a web site. At state 304 the order (or a portion thereof) is assigned to a fulfillment center, which can include a warehouse such as that illustrated in FIG. 2. At state 306, a determination is made as to whether it is within time N before the order is charged, billed, packed, and/or shipped. If not, the process waits until it is within time N. If it is within time N the process proceeds to state 307. Time N, for example, can be one or more days removed from the time the order was received. At state 307 a determination is made by the task management and article classification system 102A and/or the warehouse control system 104A as to which article or articles are eligible to be added to an order or a portion thereof. Eligible articles include articles that can be added to the order without affecting the shipping date and/or shipping costs billed to the user. Thus, for example, eligible articles might include those that are currently in short-term inventory in the same fulfillment center as the article in the pending order.

At state 308 a notification is sent to the user regarding the eligible articles and the time M the user has to order one or more of the eligible articles. As previously discussed, the notification may take a number of different forms. The user can be provided with the notification in a form such as e-mail where the user will receive the message even if the user is not accessing the site operated by web server 100A. Optionally, the notification may only be conveyed in a fashion that depends upon a determination that the user is currently available to view or receive the notification, such as, for example, when the user is currently viewing the website served by web server 100A, or is using a toolbar or accessing another website that the website operator is able to monitor. In this latter form, the notification can be a graphic element on the page, such as flashing toolbar icon. The notification can be spaced apart in time from the placement of the existing order. For example, the notification can be provided several hours after the placement of the existing order, or one or more days after the placement of the existing order.

When the user responds to the notification by, for example, clicking on an embedded URL link in the e-mail or clicking on the toolbar icon, a URL is accessed via a browser and the user is presented with a web page including a list of eligible articles generated at state 307 (such as the web page depicted in FIG. 7, and described below). In addition, the user can be presented with one or more incentives to order one or more eligible articles. For example, the user can be offered discounts, reduced or free shipping, free additional articles, credits towards future purchases, and/or other types of incentives or offers.

At state 310, a determination is made as to whether, in response to the notification and as part of a second order session, one or more additional articles were added to the order within time M. If yes, the process proceeds to state 312 and the article or articles are added to the order. If no, the process proceeds directly to state 314. At state 314, workers or automated conveyor mechanisms process all or a portion of the order, including packing and shipping the order. The shipped package includes at least one article from the original order and added articles, if any. At state 316, the user is charged for the order, including any articles that were added to the order.

Figure 4:
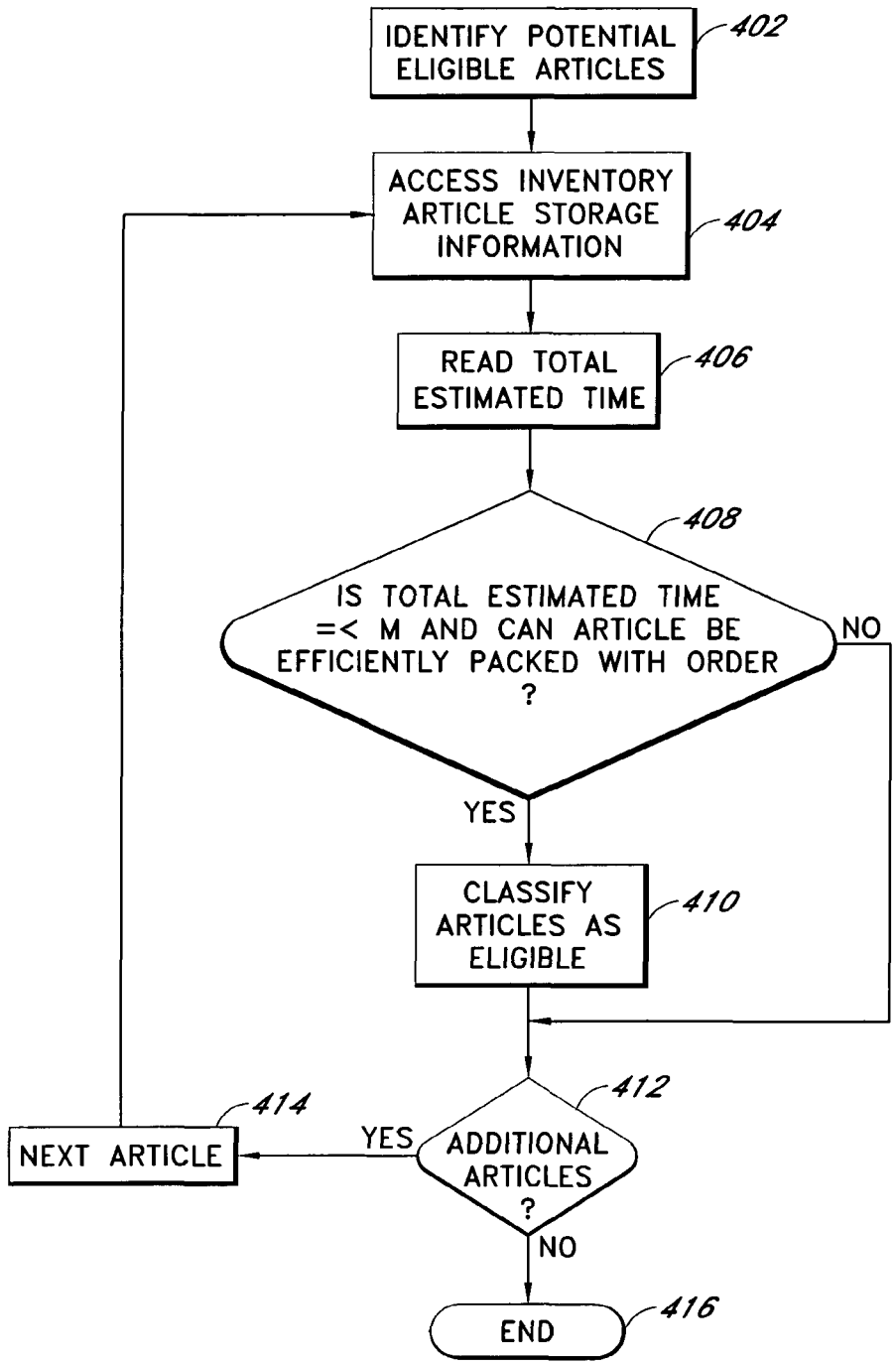
FIG. 4 illustrates an example article classification process.

FIG. 4 illustrates state 307 in greater detail. The process is performed by the task management and article classification system 102A, the warehouse control system 104A, or the two systems operating in conjunction with each other. At state 402, articles are classified as being potentially eligible articles, that is, articles that are potentially eligible to be selected by a user to add to the user's already pending order. A number of techniques may be used, either alone or in combination, to select the set of potentially eligible articles. For example, collaborative filtering techniques may be used to determine what articles the user might want to order. As is well known in the art, collaborative filtering is used to produce personal suggestions or recommendations by examining the similarity between a given user's preferences or order history and that of other people. The potentially eligible articles can also be selected based on a relationship to one of the articles already ordered. For example, if the user ordered a digital camera, the set of potentially eligible articles can include batteries for the camera, a camera case, and/or a memory card. The potentially eligible articles can also be selected based on a variety of other factors. These other factors can include, for example, whether there are articles or products that manufacturers want to particularly promote, whether the articles are in stock, whether the articles are located in the immediate vicinity of the packing area and/or loading area, the article price, the amount of a given article in inventory, the size of the article, the weight of the article, the length of time the article has been in inventory, and so on.

At state 404 article inventory information for one of the set of potentially eligible articles is retrieved from a database, such as article database 104B and/or article inventory and location database 104C. FIG. 5 illustrates an example database entry for two articles, article 125691 and article 347812. The database entry includes fields corresponding to article characteristics. As illustrated, the database entry includes fields for an article identifier, article dimensions, a location identifier that indicates the row and column of the article, the estimated transfer time it would take to move the article from its storage location to the packing area, the article level, indicating which level in a stack of inventory the article is located, the estimated time it would take to retrieve the article from the stack, and the total estimated time to retrieve the article and transfer the article to the packing area. Additionally, the database entry may include the weight of the item (not shown). While in this example the location is provided in row/column format, in addition or alternatively an alphanumeric location identifier can be used, such as A54312, which would correspond to a physical location. Similarly, rather than have length, width, and height dimensions in the dimensions field, a total volume dimension can be used, or an alphanumeric identifier that corresponds to a given size, dimension or volume. For example A1 can be used to refer to an article, in its manufacturer packaging, that has a volume in the range of 150 to 180 cubic inches. The estimated times can be based on averages of actual transfer times, or can be based at least in part on estimated walking time or driving time to traverse the distance from a storage location to the packing area or loading dock. Rather than being precalculated and stored in the database, the estimated times may also be calculated on the fly based on the location of the item and the known warehouse layout.

Returning to FIG. 4, at state 406 the total estimated time to retrieve the article and transfer the article to the packing area is read from the database 104B or 104C. At state 408 the total estimated time is compared to time M. If the total estimated time is less than or equal to time M then the article is classified as an eligible article, that is, an article that the user can add to the order without affecting a shipping time and/or shipping cost. In addition, a determination is optionally made as to whether an article can be efficiently packaged with the current order. Packaging efficiency may take into account the volume of the product and/or the weight of the product. For example, if the current order is for a vacuum cleaner, it may not be efficient to package the vacuum cleaner with an article having certain dimensions, such as a bicycle. Moreover, if the articles in the current order weigh in aggregate less than a pound, it may not be efficient to add an additional article that weighs five pounds to the order.

If the total estimated time is less than or equal to time M, and optionally if the article can be efficiently packed or boxed with the existing order, then at state 410 the article is classified as an eligible article. At state 412 a determination is made as whether there are additional articles in the potential eligible article set that have not yet been evaluated. If yes, the process proceeds to state 414, and the classification process is performed on the next article. Once the articles in the set have been analyzed the process illustrated in FIG. 4 ends at state 416.

Figure 6A:
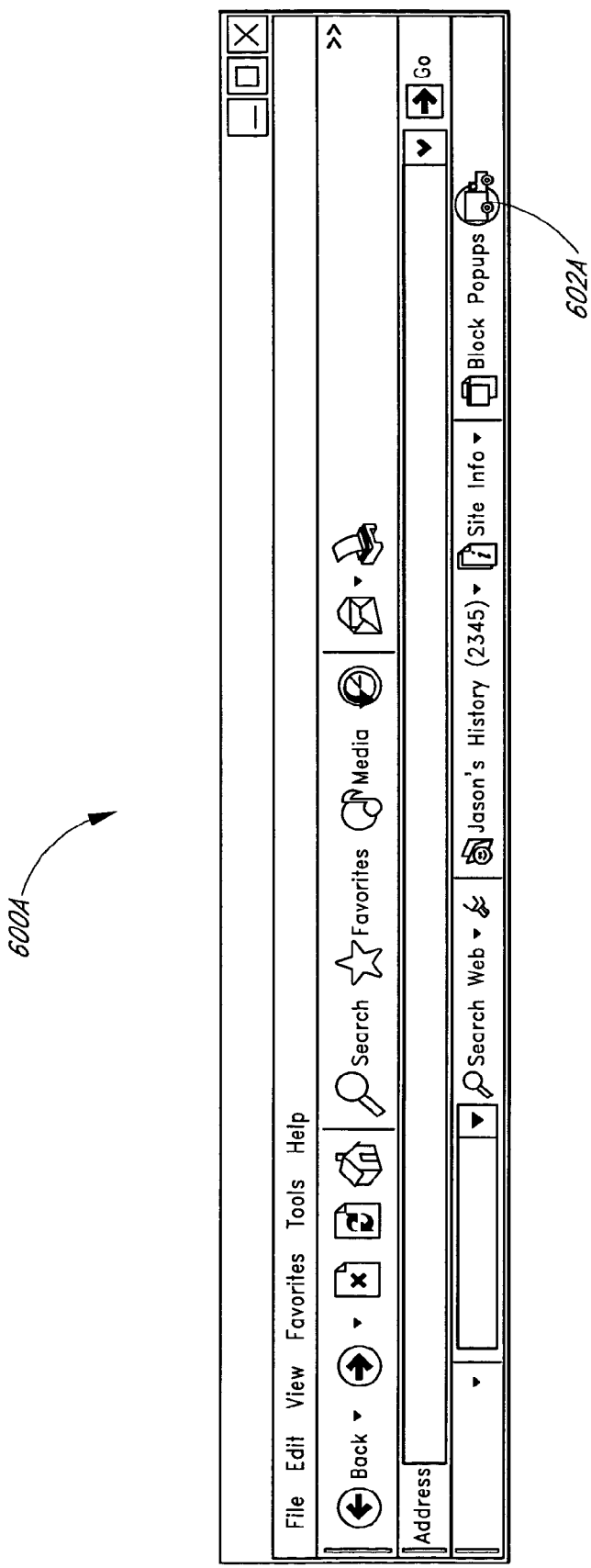
FIGS. 6A, 6B illustrate example tool bars used to provide a notification to a user.

FIG. 6A illustrates an example toolbar 600A that can be used to provide a notification message to a user that the user's order will ship shortly and that the user can add one or more articles to the order and shipment. In the example toolbar, a truck icon 602A is used to provide the notification. In one embodiment, the truck icon 602A only appears to offer the user an opportunity to add another product to an existing order as discussed above. If no offer exists, the truck icon is absent from the toolbar. In another embodiment, the truck icon 602 is constantly displayed on the toolbar, but flashes or changes color, such as to green, when the user is being provided the option to add to the order without incurring a shipping penalty. In one embodiment, the user can click on the icon to access a remote site that will display a Web page listing the articles the user can add to the order without incurring a shipping penalty. FIG. 7 illustrates one such Web page, which is discussed in greater detail below. The toolbar can optionally be continuously displayed via the user browser and/or other application even when the user is not viewing a website associated with the toolbar provider, such as an online retailer.

The toolbar 600A can be displayed upon startup of the computer, upon the user logging in, upon a user selection, upon launching an Internet browser, or upon another trigger. The functions of the toolbar can optionally be integrated into the toolbar on the user's browser. While the icon to notify the user may be displayed anytime there is an opportunity to add to an existing order, preferably the icon is displayed on the toolbar only when it is known that the user that placed the original order is using the browser. In order to identify when the user is present to the order processing system, the toolbar can be associated with a client application residing and executing on the user terminal or computer. The client application can periodically transmit an identifier over the Internet to the order processing system indicating that the client application is online. The order processing system deduces from the presence information that it is likely that the user is viewing the user's terminal display and/or the toolbar. If the order processing system ceases to receive the identification information, the system infers that the user is offline. Presence detection can also be performed by the order processing system polling or pinging the client application executing on the user terminal. By first detecting whether the user is currently online before sending a notification, the system can better ensure that the notification is viewed and acted upon by the user. Requiring the user to be present also helps ensure that the notification is not inadvertently presented to another party (not the user associated with the original order) that is using the user's terminal.

Figure 6B:
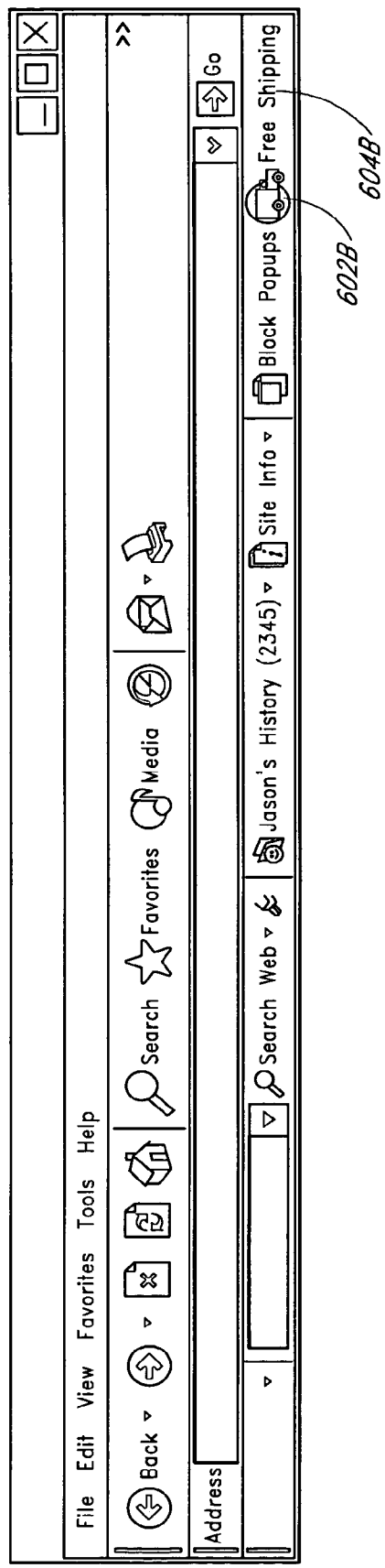

FIG. 6B illustrates another example toolbar 600B, wherein an order incentive 604B is displayed in association with an offer notification icon 602B. In this example, the order incentive 604B is free shipping. Other incentives, such as discounts on items, can be displayed as well. When the user clicks on the notification icon 602B or the order incentive 604B, the order screen illustrated in FIG. 7 is transmitted by the web site server 100A to the user browser for display.

FIG. 7 is a representative article order screen depicting one example of an interface that would allow a user to add an item to an existing order. The interface can be displayed via the user browser during a network session initiated in response to the user clicking on a toolbar notification icon, such as that illustrated in FIGS. 6A and 6B, by clicking on an emailed link sent to a user email address, where the link is to a Web page corresponding to the interface, or can be automatically presented to the user when the user visits the Web site hosted by the Web site server 100A. The offers depicted on the article order screen could also be inserted directly into the email that is sent to the user.

As illustrated, the order screen 700 lists one or more items that can be added to the existing order without adversely affecting the shipping date of the existing order. In this example, the user is given 30 minutes to add the items to the order. In addition, the order screen 700 optionally provides the actual time and date, 6:45 PM, July, 2003, in this example, at which the user's ability to add items to the order will expire. The order screen 700 lists the price for each item, as well as corresponding order incentives or special offers, if any. In this example, each item is associated with an "add to order" button or link, which, when activated by the user, adds the corresponding item to the user's existing order. In the illustrated example, headphones are offered at a 10% discount and with free shipping if added to the existing order. A compact flash memory card is offered without an incentive. Batteries are offered with a free shipping incentive.

Figure 8:
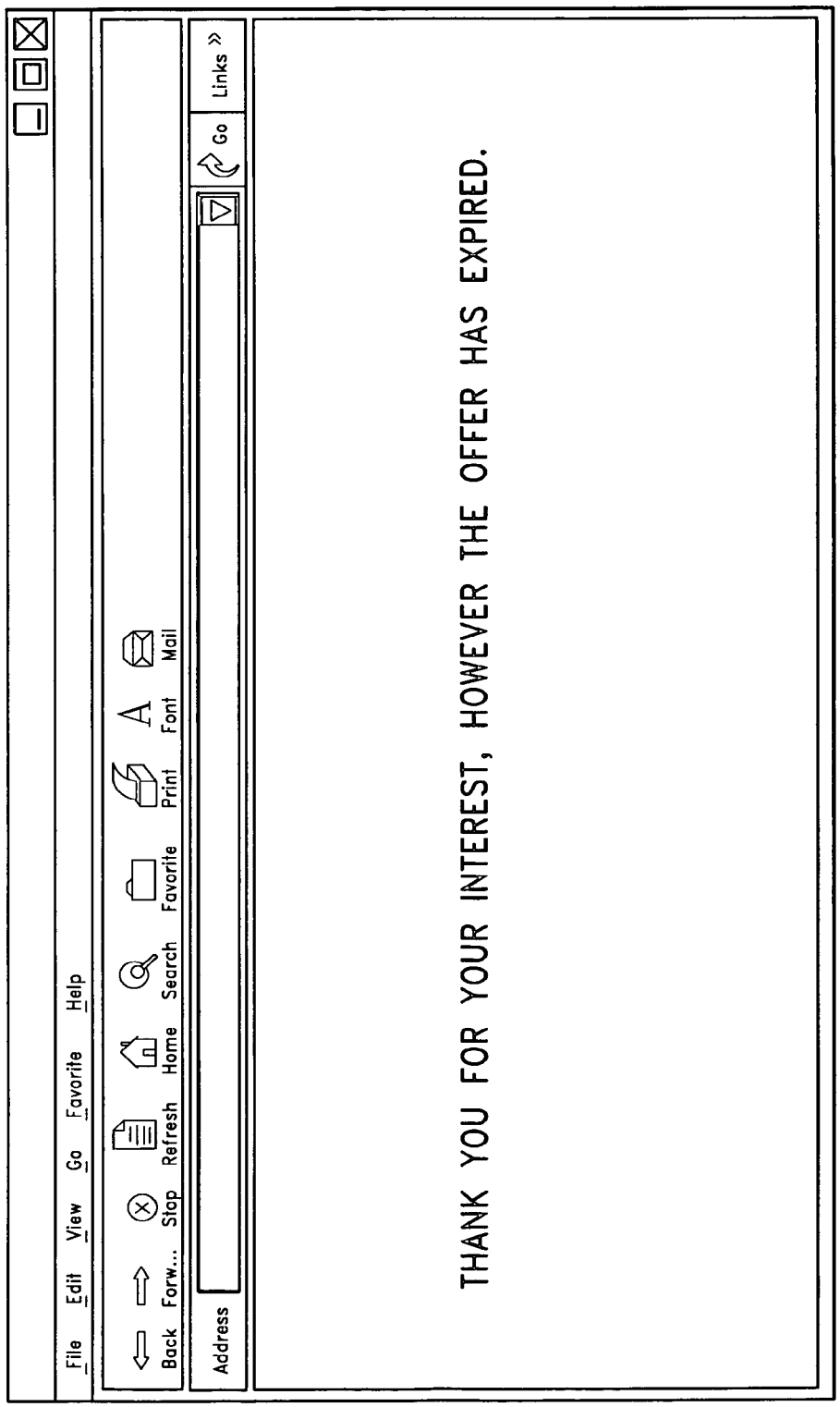
FIG. 8 illustrates an example offer expiration notice

With respect to an emailed offer to add items to an existing order, wherein the emailed offer includes a link to an article order screen, such as that illustrated in FIG. 7, there will be occurrences when the email becomes stale, wherein the user will not view the email until after the offer expiration time has passed. In one embodiment, if the user clicks on the emailed link after the offer expiration time, an expiration notice will be transmitted by the Web site server 100A to the user terminal for display on the user browser. FIG. 8 illustrates an example expiration notice 800. As illustrated, the notice 800 informs the user that the offer has expired.

Thus, embodiments of the present invention appropriately classify articles to provide for the efficient packing, transportation and delivery of articles. Advantageously, embodiments of the present invention notify a user who ordered a product when the ordered product is about to ship and allow the user to add articles that the system has classified as being eligible based on selected article characteristics. Embodiments of the present invention thereby facilitate the shipment of multiple products together, reducing the overall consumption of packing materials and the amount of energy consumed in transporting products.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. While a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Thus, it is intended that the scope of the present invention herein disclosed should not be limited by the particular disclosed embodiments described above.

What is claimed is:

1. A system, including one or more computing devices, for classifying articles stored in a structure, comprising:
 one or more computing devices;
 a first module stored in tangible, non-transitory memory that, when executed, is configured to cause the system to accept an order for an article that is placed by a user during an order session, and track a location of the article within a structure in which the article is stored;
 a second module stored in tangible, non-transitory memory that, when executed, is configured to cause the system to classify a set of articles stored in the structure based at least upon their ability to be used in conjunction with the ordered article;
 a third module stored in tangible, non-transitory memory that, when executed, is configured to cause the system to cause a notification to be provided to the user after the order session is complete, wherein the notification indicates to the user that the user can add at least one additional article to the order; and
 a fourth module stored in tangible, non-transitory memory that, when executed, is configured to cause the system to, in response to a user action, inform the user that the user has a time period within which to request that at least one article from the classified set of articles be shipped with the previously ordered article, wherein the fourth module is configured to calculate an estimated time comprising an estimate of how much time it would take to retrieve the at least one article from a stack, the stack having more than one level, and how much time it would take to transfer the at least one article in the set of articles to a first location within the structure and to set the time period of which the user is informed to be less than the calculated estimated time.

2. The system as defined in claim 1, further comprising an article database that stores article location information.

3. The system as defined in claim 1, wherein the time period is based in part on article size.

4. The system as defined in claim 1, wherein the time period is based in part on an anticipated ship date for the order.

5. The system as defined in claim 1, wherein the time period is based in part on an anticipated packing date for the order.

6. The system as defined in claim 1, wherein the time period is based in part on a charge date for the order.

7. The system as defined in claim 1, wherein the first location is a packing area.

8. The system as defined in claim 1, wherein the first location is a loading dock.

9. The system as defined in claim 1, wherein the notification is provided to the user at least partly in response to determining that a terminal associated with the user is online.

10. The system as defined in claim 1, wherein the notification is provided to the user via a toolbar displayed on a user terminal.

11. The system as defined in claim 1, wherein the notification includes a link to a list of at least a portion of the set of articles.

12. The system as defined in claim 1, wherein the notification includes a list of at least a portion of the set of articles, wherein the size of the portion is based at least in part on a terminal type used to receive the notification.

13. The system as defined in claim 1, wherein the set of articles is selected at least in part using collaborative filtering.

14. The system as defined in claim 1, wherein the second module is configured to cause the system to classify the set of articles at least in part based on the operability of the articles in the set to power, encase, or connect with the ordered article.

15. The system as defined in claim 1, wherein the second module is configured to cause the system to classify the set of articles based at least in part on information related to location.

16. The system as defined in claim 1, wherein the second module is configured to cause the system to classify the set of articles based at least in part on information related to profit margin.

17. The system as defined in claim 1, wherein the second module is configured to cause the system to classify the set of articles based at least in part on information related to the time the articles have been stored in the structure.

18. A method for classifying articles stored in a structure, comprising:

accepting an order at a computer system for an article that is placed by a user during an order session;

tracking, by the computer system, a location of the article within a structure in which the article is stored;

classifying a set of articles stored in the structure based at least upon their ability to be used in conjunction with the ordered article;

providing, by the computing system, a notification to the user after the order session is complete, wherein the notification indicates to the user that the user can add at least one additional article to the order; and in response to a user action, transmitting a notification by the computer system informing the user that the user has a time period within which to request that at least one article from the classified set of articles be shipped with the previously ordered article, wherein an estimated time is calculated comprising an estimate of how much time it would take to retrieve the at least one article from a stack, the stack having more than one level, and how much time it would take to transfer the at least one article in the set of articles to a first location within the structure, wherein the time period included in the notification is set to be less than the calculated estimated time.

19. The method as defined in claim 18, wherein the time period is based in part on article size.

20. The method as defined in claim 18, wherein the time period is based in part on an anticipated ship date for the order.

21. The method as defined in claim 18, wherein the time period is based in part on an anticipated packing date for the order.

22. The method as defined in claim 18, wherein the time period is based in part on a charge date for the order.

23. The method as defined in claim 18, wherein the first location is a packing area.

24. The method as defined in claim 18, wherein the notification includes a link to a list of at least a portion of the set of articles.

25. The method as defined in claim 18, wherein the set of articles is selected at least in part using collaborative filtering.

26. The method as defined in claim 18, wherein the set of articles is selected at least in part based on the operability of the articles in the set to be used to power, encase, or electronically connect with the ordered article.

27. The method as defined in claim 18, wherein the act of classifying the set of articles is based at least upon information related to location.

28. The method as defined in claim 18, wherein the act of classifying the set of articles is based at least upon information related to profit margin.

29. The method as defined in claim 18, wherein the act of classifying the set of articles is based at least upon information related to the time the articles have been stored in the structure.

* * * * *